United States Patent
Padgett (10) Patent No.: US 7,266,041 B1
(45) Date of Patent: Sep. 4, 2007

(54) MULTI-ATTRIBUTE BACKGROUND RELATIVE SCANNING OF 3D GEOPHYSICAL DATASETS FOR LOCALLY ANOMALUOUS DATA POINTS

(76) Inventor: Michael John Padgett, 3709 Graustark St., Houston, TX (US) 77006

( * ) Notice: Subject to any disclaimer, the term of this patent is extended or adjusted under 35 U.S.C. 154(b) by 61 days.

(21) Appl. No.: 11/158,118

(22) Filed: Jun. 21, 2005

(51) Int. Cl.
*G01V 1/28* (2006.01)
*G01V 1/34* (2006.01)

(52) U.S. Cl. .................. 367/72; 367/38; 367/40; 367/73; 702/14

(58) Field of Classification Search ............. 367/38, 367/40, 43, 72, 73; 702/14
See application file for complete search history.

(56) References Cited

U.S. PATENT DOCUMENTS

| | | | |
|---|---|---|---|
| 4,633,401 A * | 12/1986 | Flinchbaugh | 367/72 |
| 5,001,677 A | 3/1991 | Masters | |
| 5,586,082 A * | 12/1996 | Anderson et al. | 367/73 |
| 5,675,551 A * | 10/1997 | Sitoh | 367/73 |
| 5,862,100 A | 1/1999 | VerWest | |
| 5,966,672 A * | 10/1999 | Knupp | 702/16 |
| 6,058,074 A | 5/2000 | Swan | |
| 6,765,570 B1 * | 7/2004 | Cheung et al. | 345/420 |
| 6,865,521 B1 * | 3/2005 | Padgett | 703/2 |
| 7,024,021 B2 * | 4/2006 | Dunn et al. | 367/72 |
| 2005/0190650 A1 * | 9/2005 | Ferber et al. | 367/43 |
| 2006/0056272 A1 * | 3/2006 | Hill | 367/73 |

* cited by examiner

*Primary Examiner*—Jack Keith
*Assistant Examiner*—Scott A Hughes
(74) *Attorney, Agent, or Firm*—Buskop Law Group, PC; Wendy Buskop (57) ABSTRACT

Methods for scanning geophysical data sets to find geological entities with specific geophysical responses entail selecting a focus sub-volume and a background sub-volume proximal to the focus sub-volume. The sub-volumes include discrete sampling locations and are located within at least two geophysical data sets. Each discrete sampling location has associated data values. The background data volume and each data value are normalized. A determination is made to whether a data value is inside or outside of the background data. A distance value is associated with each determination. The distance values are evaluated to find discrete sampling locations with specific geophysical responses. The anomalous data points can be related to the presence of hydrocarbon or water bearing strata at the corresponding depth locations of the data points.

22 Claims, 4 Drawing Sheets

MULTI-ATTRIBUTE BACKGROUND RELATIVE SCANNING OF 3D GEOPHYSICAL DATASETS FOR LOCALLY ANOMALOUS DATA POINTS

FIELD

The present embodiments relate to the simultaneous processing of multiple volumes of geophysical data for the detection of hydrocarbon deposits in the subsurface.

BACKGROUND

The goal of hydrocarbon exploration is to find porous and permeable geologic deposits containing high pore-space saturations of hydrocarbons, under sufficient pressure to allow some mode of commercial production. In pursuit of this goal, companies, countries and individuals collect and process many types of geophysical and geological data. The data are often analyzed to find anomalous zones that can reasonably be attributed to the presence of hydrocarbons.

The usage of 2D and 3D seismic data anomalies has been a standard practice in the petroleum industry since the 1960s. Other geologic and geophysical data anomalies have been tried, sometimes successfully, for over a century. These include various gravimetric, electromagnetic, chemical, biological and speculative methods.

The usage of anomalies for oil and gas detection has been plagued by several problems. First, most remote sensing anomalies (e.g., a 3D seismic amplitude anomaly) cannot be directly tied to a rock property that could be measured in the laboratory or using well logs. Much effort is expended attempting to tie observed anomalies to known rock responses by modeling the expected attribute response or otherwise correlating with a known producing reservoir. This work is often based on the experience of the practitioner.

A second problem is that the anomalies themselves are often evaluated or tied to response models in a qualitative manner. With qualitative assessment as the basis, quantitative, objective and reproducible error analysis has not been possible.

A third problem is that a basic physical property at work in hydrocarbon reservoirs is that both oil and gas are less dense than water. This generally causes oil and gas to accumulate up-structure in the pore-space of potential reservoir rocks. The higher water saturations are found, generally, down-structure. This separation of saturations is driven by gravity. When such a separation of fluid types occurs, flat interfaces, in depth, are expected to form.

This separation causes numerous possible classes of data attribute response. First, the hydrocarbon reservoir will have one response for each hydrocarbon type. The water-saturated part of the reservoir may have a second data response and the interfacial area a third type of attribute data response. This sequence of responses in the processed attribute data allows for a simultaneous analysis of the three classes.

Another problem is that the strengths of many types of data attribute anomalies are dependent on the rock physics of the geologic systems. Some anomalies are very evident in the data. Others can be very subtle and cause considerable debate. An associated problem is that much work in hydrocarbon exploration continues to be done in areas where the data are poor, noisy or difficult to interpret. In areas of good data quality, many high-strength anomalies are adequately interpreted by inspection. As the data quality and/or imagining ability of the data degrade, verifying whether a legitimate anomaly does or does not exist in a given set of data is very difficult, especially when the rock physics suggests that any meaningful anomaly would be subtle.

The lack of quantification, error analysis, subjectivity of analysis and data quality issues cause variations in the appraisal of data anomalies in oil and gas exploration and production projects. It is not uncommon for different individuals or companies to examine the same anomaly and reach irreconcilably, different conclusions. In many cases, explaining quantitatively why the anomaly of one prospect should be "believed or trusted" more than that of another prospect has not been possible. This lack of trust causes different entities to make drastically different investment decisions concerning prospects based on the same underlying data.

The present embodiments are designed for the quantification and evaluation of data anomalies in the search for producible hydrocarbon deposits. The present embodiments are designed to simultaneously quantify and summarize the hydrocarbon reservoir part of the anomaly, the water reservoir part of the data and the interfacial zone. The embodiments address the case of multiple hydrocarbon zones, e.g., gas over oil over water. The embodiments are designed to test the model wherein gas is less dense than oil and oil is less dense than water, with data responses varying by structural position.

The current embodiments can be used for the quantification of changes in lithology, facies, or rock fabric from one location to another. The current embodiments are designed to function in areas of low signal-to-noise and aid in the determination of data suitability for hydrocarbon detection for the expected rock physics environment. The current embodiment, therefore, can be applied to the detection of subtle hydrocarbon related data anomalies.

The prior art includes isolated instances of attempts to include background analysis of seismic traces to find zones which are anomalous with respect to that background. U.S. Pat. No. 5,001,677 teaches an approach wherein multiple seismic attributes are assigned to a vector space and a background vector is constructed using, in the preferred implementation, the median of a set of attribute vectors along a seismic trace, below a given location on the earth. A distance is measured from the background vector to the data vector at a location of interest. U.S. Pat. No. 6,058,074 teaches an approach to amplitude versus offset trace processing wherein the traces are scaled by means and standard deviations of the data in background windows. Two new volumes of appropriately scaled trace intercept values and trace gradient values are then produced. U.S. Pat. No. 5,862,100 teaches the extraction of anomalous AVO points from associated background points using a statistical description of the AVO background data. This robust method is used when the background can be described by a single statistical distribution. The taught method lacks the ability to handle structured non-statistical background clusters and suffers from sampling errors on some datasets if all background windows are chosen identically.

A need exists for a method to scan large amounts of geophysical data sets systematically and simultaneously to find the presence of hydrocarbons. The method should honor non-statistical and highly structured (due to geology and rock properties) host rock geophysical responses. The method should honor small changes in the host rock layering or composition in constructing background data volumes for normalization and scanning.

The present embodiments meet these needs.

BRIEF DESCRIPTION OF THE DRAWINGS

A specific embodiment of the method will be described by way of example with reference to the accompanying drawings, in which.

The present method is detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to improvements in the scanning of multiple volumes of geophysical data in order to search for anomalous data points. The anomalous data points can be related to the presence of hydrocarbon or water bearing strata at the corresponding depth locations of the data points. The embodied methods use multiple data points from each of two or more volumes of data to determine a background data field. A given data point in a target area is compared to the background data field in order to determine if the data point is inside or outside of the background data field. If the data point is inside the background data field, a zero distance value is attributed to the data point. If the data point is outside of the background data field, a non-zero value is attributed to the data point based upon the distance from the background data field. All points of interest in a three-dimensional seismic survey volume are queried. The resulting distance values are evaluated to produce a new three-dimensional data volume that characterizes the distance of the data point at each location from the local background data field.

The shapes of the background data fields in N-dimensional attribute space throughout the region of a three-dimensional seismic survey volume have been observed to change from location to location due to changes in lithology, stratigraphy, geologic structure, noise, and other similar variables. From observation, the background data fields have been found to be the overlapping sum of the background data contributions of each local lithology, of local stratigraphy of local structure and of local noise. The embodied methods utilize a deterministic background calculation in lieu of a statistical background calculation.

The embodied methods extend known methods that utilize the shape of the background data field to form a closed polygon in N-dimensional attribute space. The polygons created from the embodied methods may not be simply closed polygons and can contain holes, like a donut or a pretzel. This type of closed polygon provides a better analysis and is used 1. in determining if the data at point of interest is part of the geologic background data signal (within the polygon), 2. in determining if the data is significantly removed from the background data field, and 3. in determining the distance of the data point from the edge of background data field. Points that are sufficiently removed from the background data field are designated as geophysically anomalous. These geophysically anomalous points are assigned to their correct location on a three-dimensional data volume with a value derived from the distance from the closed polygon in some direction in N-dimensional space.

The present methods are used to detect the changes in attribute response when moving from a background water reservoir to a hydrocarbon reservoir. The results from the embodied methods are used to determine if exploration or production activities should continue in a given area. In addition, the methods provide accurate analysis in high noise, low signal to noise environments, where the data quality is poor. This accuracy in high noise, low signal to noise environments is a contrast to known methods.

The embodied methods operate on subtle hydrocarbon indicators. The embodied methods fully characterize the hydrocarbon inner and outer edges. The embodied methods can be used determine the errors and uncertainties in all measurements and data attribute results relative to a given hydrocarbon reservoir and the corresponding water reservoir.

Figure 1:
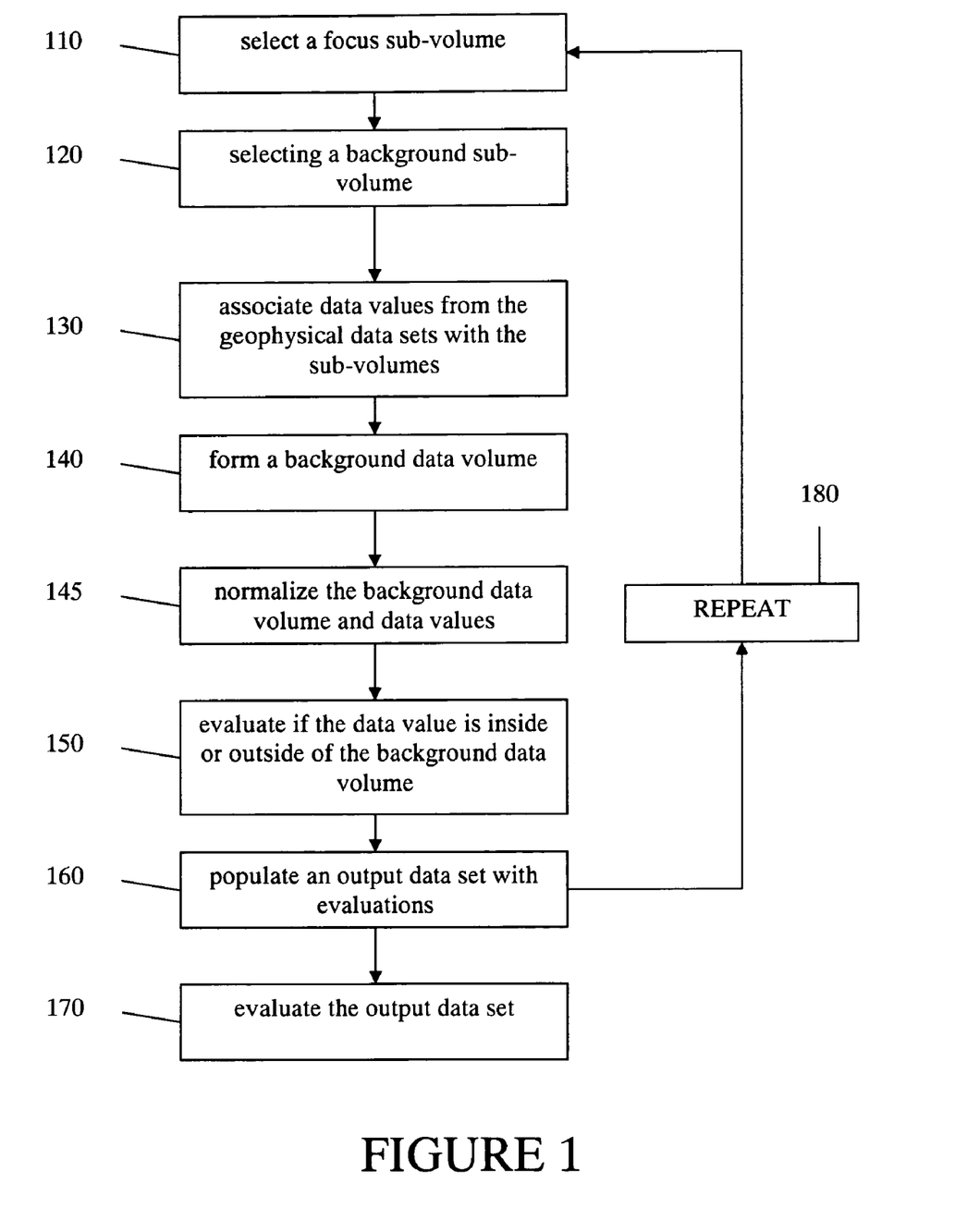
FIG. 1 is a schematic of an embodiment of a method for scanning geophysical data sets to find geological entities with specific geophysical responses.
Figure 2:
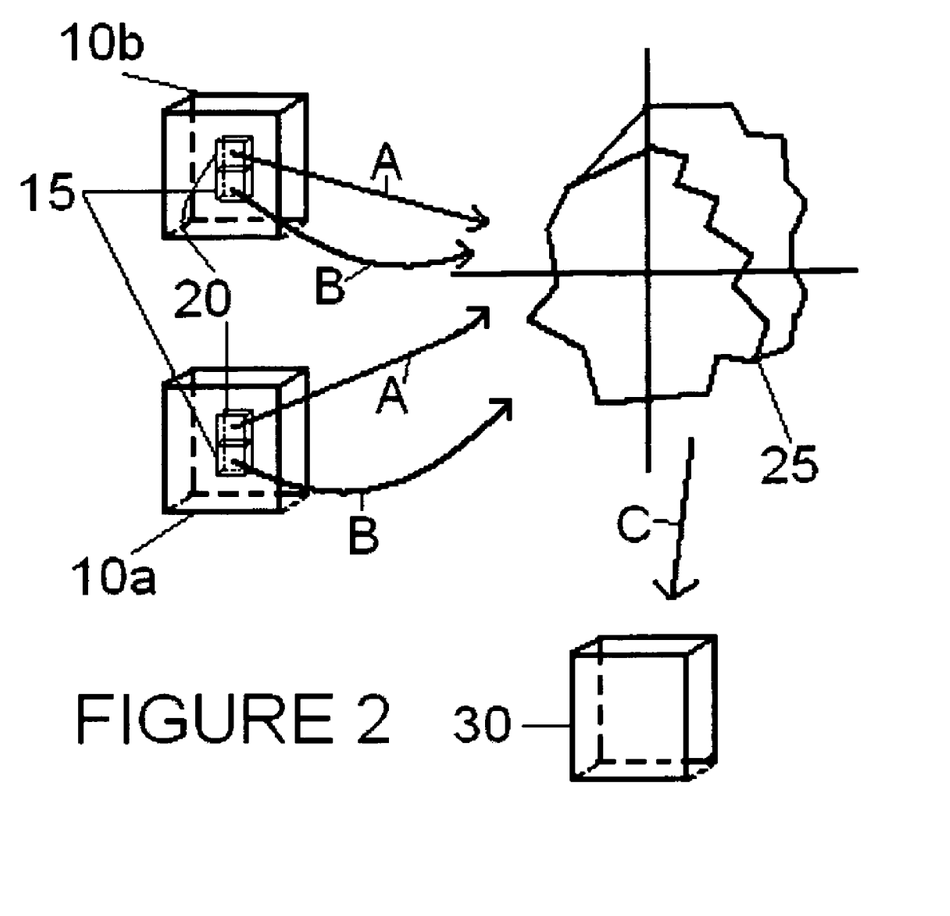
FIG. 2 is a representation of an embodiment of a method for scanning geophysical data sets to find geological entities with specific geophysical responses.

With reference to the figures, FIG. 1 is a schematic of an embodiment of a method for scanning geophysical data sets to find geological entities with specific geophysical responses. FIG. 2 is a representation of an embodiment of a method for scanning geophysical data sets to find geological entities with specific geophysical responses. Examples of geophysical data sets (10a and 10b) include seismic reflection data, seismic velocity data, geophysical gravity data, geophysical remote sensing data, geologic measurements, petro-physical measurements, other types engineering data, and other types of physical measurements. The data can be collected or complied for a particular area of interest or can be processed using a defined attribute generating algorithm.

The methods begin by selecting a focus sub-volume (15) (Step 110). As seen in FIG. 2, the focus sub-volume (15) is located within two or more of the geophysical data sets (10a and 10b). Even though, FIG. 2 represents only two geophysical data sets (10a and 10b), the embodied method can be used to scan and analyze two or more geophysical data sets. If three or more geophysical data sets are used, the focus sub-volume (15) needs to be located within at least two geophysical data sets (10a and 10b). If the focus sub-volume (15) is not located within a geophysical data set, a null value is set for the data points in the focus sub-volume (15) associated with that particular geophysical data set. A more accurate analysis is produced if the focus sub-volume (15) is located within all of the geophysical data sets.

The focus sub-volume (15) includes discrete sampling locations that correspond to data values in the geophysical data sets. The focus sub-volume (15) can be selected by choosing a set of closed polygons, by choosing a specific volume located in the geophysical data sets, or by randomly choosing a volume or location.

The process of randomly choosing a volume or location will be discussed in further detail later in this paper. If chosen specifically, the focus sub-volume (15) can be a geographic area for a hydrocarbon reservoir, a geographic area for a water reservoir, a contiguous hydrocarbon and water reservoir, a geographic area containing non-prospective geologic formations for error analysis, and combinations thereof.

Continuing with FIG. 1 and FIG. 2, the methods continue by selecting a background sub-volume (20) (Step 120). The background sub-volume (20) is proximal to the focus sub-volume (15). The background sub-volume (20) can be adjacent to the focus sub-volume (15) or can overlap the focus sub-volume (15). The background sub-volume (20) can be situated so that a space exists between the background sub-volume (20) and the focus sub-volume (15). FIG. 2 depicts the embodiment of the background sub-volume (20), wherein the background sub-volume (20) is adjacent and above the focus sub-volume (15). Even though, FIG. 2 represents only one background sub-volume (20) associated with each focus sub-volume (15), the embodied methods can be used to incorporate two or more background sub-volumes associated with each focus sub-volume (15). Each background sub-volume is proximal to the focus sub-volume. Each background sub-volume can be separate, overlap, or be adjacent to one another. Each background sub-volume (20) includes background discrete sampling locations that correspond to data values in the geophysical data sets.

Like the focus sub-volume (15), each background sub-volume (20) is located within two or more of the geophysical data sets (10a and 10b), as depicted in FIG. 2. A more accurate analysis is produced if the background sub-volume (20) is located within all of the geophysical data sets, but is not necessary for the computation.

Continuing with FIG. 1, data values in the geophysical data sets are associated with each discrete sampling location and with each background discrete sampling location located in the focus sub-volume and each background sub-volume respectively (Step 130).

A background data volume or shape is formed by merging, calculating, or plotting the data values associated with the background data volume that comprises the data values associated with the background discrete sampling locations (Step 140). The arrows labeled "A" in FIG. 2 represent the data values in the background sub-volume (20) being plotted together on a common graph to create the background data volume or shape (25). The background data volume can be created by plotting the data values associated with the background discrete sampling locations using geographic coordinates, such as an X-Y prospect coordinate system; an X-Y field development system; latitude and longitude; an internal three-dimensional seismic survey coordinates; and combinations thereof.

The background data volume or shape can be a region of the N-dimensional data volume space having geophysical instrument response that is typical of host rock near a region of possible production interest. The background data volume should not contain geologic formations of specific production interest. For example, if the intent of the analysis is to find natural gas bearing gas sands, the background data volume should not span any geologic zones containing commercially producible natural gas. Even though this suggestion provides a better analysis, the inclusion of the information does not affect the embodied methods.

Forming a background data volume proximal to the focus sub-volumes provides a benefit in that using the comparison of the data points in the focus sub-volume to the background data volume reduces false readings. Since geophysical data volumes are often collected and processed by differing entities using differing instruments and algorithms, background data volumes provide a method for normalization that is local and capable of honoring local variations in data means, standard deviations and more comprehensive data structure and distributions. The methods incorporate a step of normalizing the background data volume and each data value, forming a normalized background data volume and normalized data values (Step 145). The normalization reduces false anomaly readings by quantitatively characterizing host rock geophysical responses.

As an example, the background data volume and each data value can be normalized using a mean and a sequence of normalization factors for each data type in the background data volume. The methods of normalizing the background data volume and each data value can entail removing from the background data volume any data values associated with discrete sampling locations that have previously been assigned a non-zero distance. A mean and a sequence of normalization factors are determined for each data type in the background data volume. Next, the normalizing method entails subtracting from each data point in the background data volume the mean and dividing by the sequence of normalization factors and, subsequently, subtracting from each discrete sampling location the mean from the background data volume and dividing by the corresponding normalization factors.

The sub-volumes of the normalized background data space can be designated up-front to be zero, which can only be done with normalized data. This zeroing designation allows regions of n-dimensional data space that are believed to be non-hydrocarbon zones to be excluded, based on external rock physics understanding. In other words, the excluded data points can correspond to regions that have geophysical attributes that are known. By excluding these data points, the embodied methods can provide a faster scan and more precise scan of large amounts of geophysical data sets.

Continuing with FIG. 1, an analysis is made as to whether each normalized data value associated with each discrete sampling location in the focus sub-volume (15) is inside or outside of the normalized background data volume (25) (Step 150). If the normalized data value is inside of the normalized background data volume (25), a distance value of zero is associated with that data point. If the normalized data value is outside of the normalized background data volume (25), a distance value of a non-zero value is associated with that normalized data point. The non-zero value can be a positive or negative value. The arrows labeled "B" in FIG. 2 represent the data values in the focus sub-volume (15) being compared to the background data volume (25). A sign (for example, a positive or negative sign) can be assigned to each non-zero distance based on the direction of the normalized discrete sampling point from the origin of the normalized background data volume.

The distance values associated with each discrete sampling location in the focus sub-volume (15), both zero and non-zero, are included in an output data set (30) (Step 160). The arrows labeled "C" in FIG. 2 represent an output data set (30) being populated with the distance values. In one embodiment, the outlier distances are computed after normalization of both the background data volume and the discrete sampling location data.

As seen in FIG. 1, the embodiment method can include the step of repeating the steps until all points of interest in a three-dimensional seismic survey volume are analyzed (Step 180).

The method ends by evaluating the output data set to find discrete sampling locations with specific geophysical responses (Step 170). Anomalous data points, depicted by the size and location of distances of discrete sampling locations, can be related to the presence of hydrocarbon or water bearing strata at the corresponding depth locations of the data points.

In an alternative embodiment, the method of selecting the focus sub-volume and the background volume can include an element of randomness in order to obtain a more objective analysis of the geophysical data sets. The method of selecting the focus sub-volume can further include a systematic element in order to ensure that all points of interest in a three-dimensional seismic survey volume are analyzed.

Figure 3:
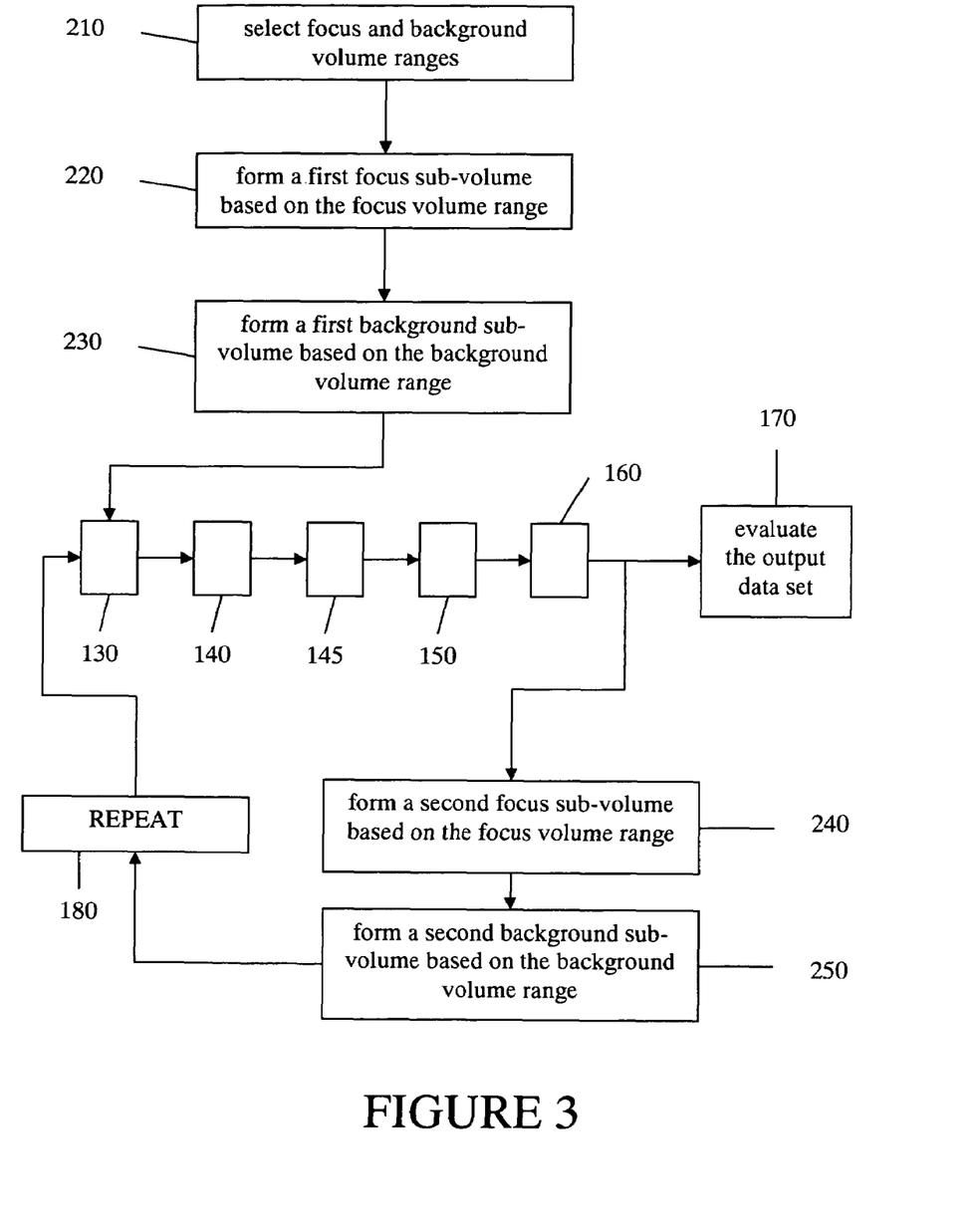
FIG. 3 is a schematic of an embodiment of a method for systematically scanning geophysical data sets to find geological entities with specific geophysical responses.

FIG. 3 is a schematic of an embodiment of a method for systematically scanning geophysical data sets to find geological entities with specific geophysical responses. The methods begin by setting a focus sub-volume range and a background sub-volume range (Step 210). The range is a set of values that correspond to the dimensional aspects for the focus sub-volume and the corresponding background sub-volume. For example, the set of values in the range can include a range for the number of traces to include in the volumes or a range for the number of samples to include in the volumes.

A first focus sub-volume is formed by randomly selecting a value from the focus sub-volume range (Step 220). Alternatively, a specific value can be selected from the focus sub-volume range. Like noted above, the focus sub-volume includes discrete sampling locations located within two or more of the geophysical data sets.

A first background sub-volume is formed by randomly selecting a value from the background sub-volume range (Step 230). Alternatively, a specific value can be selected from the background sub-volume range. Like noted above, the first background sub-volume includes background discrete sampling locations located within two or more of the geophysical data sets. Further, the first background sub-volume is proximal to the first focus sub-volume. One or more background sub-volumes can be used. The volumes for each of the background sub-volumes can be different or can share a common value.

The method continues by associating data values from the geophysical data sets with the sub-volumes, forming a background data volume, normalizing the background data volume and the data points, evaluating the data values versus the background data volume, and populating an output data set (Steps 130, 140, 145, 150, and 160). These steps are described above in this paper.

If all points of interest in a three-dimensional seismic survey volume have not been analyzed, the methods continue by forming a second focus sub-volume (Step 240). The second focus sub-volume is formed by randomly selecting a value from the focus sub-volume range (Step 220). Alternatively, a specific value can be chosen from the focus sub-volume range or the same value used for the previous focus sub-volume range can be used. The second focus sub-volume is proximal to the first focus sub-volume. The second focus sub-volume can be adjacent to the previous focus sub-volume or can overlap the previous focus sub-volume. The second focus sub-volume can be situated so that a space exists between the second focus sub-volume and the previous focus sub-volume. The second focus sub-volume includes a set of discrete sampling locations that is located within two or more of the geophysical data sets. The set of discrete sampling locations in the second focus sub-volume is different than the set of discrete sampling locations in the previous focus sub-volume.

Continuing with FIG. 3, a second background sub-volume is formed (Step 250). The second background sub-volume is proximal to the second focus sub-volume and is formed by randomly selecting a volume from the background volume range. Alternatively, a specific value can be chosen from the background sub-volume range or the same value used for the previous background sub-volume range can be used. Like the previous background sub-volumes, one or more background sub-volumes can be used. The same number of background sub-volumes is not required. The number of background sub-volumes used can be randomly selected per iteration, pre-selected, or selected at each iteration. The volumes for each of the background sub-volumes can be different or can share a common value. Each background sub-volume includes background discrete sampling locations located within two or more of the geophysical data sets.

The method continues by associating data values from the geophysical data sets with the sub-volumes, forming a background data volume, evaluating the data value versus the background data volume, and populating an output data set (Steps 130, 140, 150, and 160). The process then repeats itself until all points of interest in a three-dimensional seismic survey volume are analyzed (Step 180). The method ends by evaluating the output data set to find discrete sampling locations with specific geophysical responses (Step 170).

The described method utilizes a proximal approach in which each focus sub-volume is proximal to the previous. The benefit of the proximal approach is that the approach ensures that each point of interest in a three-dimensional seismic survey volume can be analyzed.

The methods can utilize a systematic approach. The systematic approach is performed by selecting subsequent focus sub-volumes that are adjacent and below and/or above the previous focus sub-volume. Once the focus sub-volumes reach the bottom of a survey volume, the systematic approach chooses a focus sub-volume adjacent and to the side of focus sub-volume in the previous "column". Subsequent focus sub-volumes and chosen below and/or above the previous focus sub-volumes until that "column" in the survey volume is analyzed. This systematic approach analyzes the data by processing data in "columns" then "rows" to ensure that each point of interest in a three-dimensional seismic survey volume is analyzed.

Figure 4:
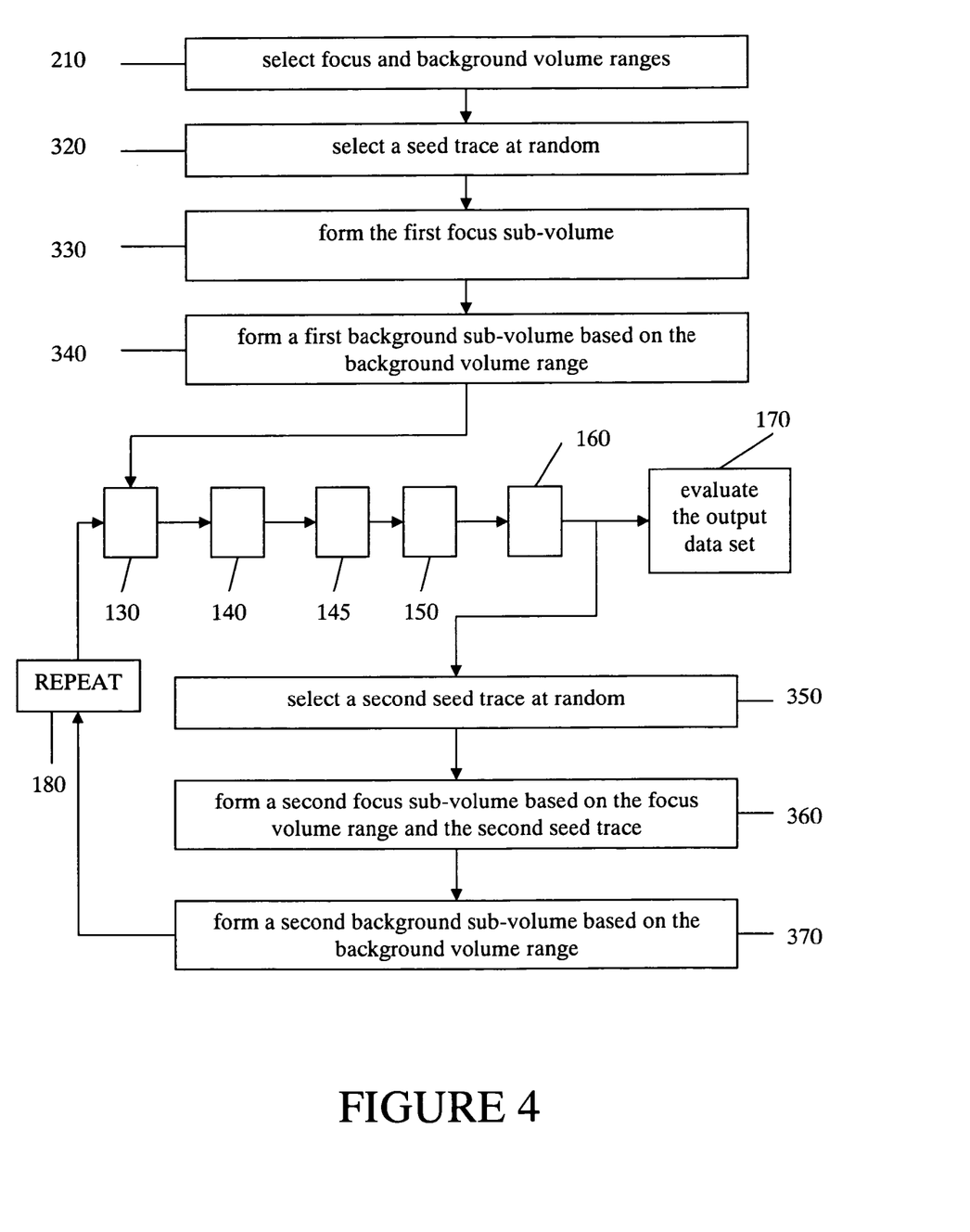
FIG. 4 is a schematic of an embodiment of a method for scanning geophysical data sets to find geological entities with specific geophysical responses using a randomly selected seed trace.

FIG. 4 is a schematic of an embodiment of a method for scanning geophysical data sets to find geological entities with specific geophysical responses using a randomly selected seed trace. The methods begin by setting a focus sub-volume range and a background sub-volume range (Step 210).

Next, a seed trace is chosen at random (Step 320). The seed trace must correspond to data value located in all of the geophysical data sets.

The first focus sub-volume is formed using a value, either selected or randomly generated, from the focus volume range. The value from the focus volume range is used to form the first focus sub-volume, wherein the volume is formed around the first seed trace (Step 330).

As previously described, a first background sub-volume is formed from a value, either selected or randomly generated, from the background sub-volume range (Step 340).

The method continues by associating data values from the geophysical data sets with the sub-volumes, forming a background data volume, normalizing the background data volume and the data points, evaluating the data values versus the background data volume, and populating an output data set (Steps 130, 140, 145, 150, and 160). These steps are described above in this paper.

If all points of interest in a three-dimensional seismic survey volume have not been analyzed, the methods continue by randomly selecting a second seed trace from the geophysical data sets (Step 350).

The second focus sub-volume is formed based upon the second seed trace and a value from the focus volume range (Step 360). One or more second background sub-volumes are formed proximal to the second focus sub-volume and based upon a value from the background volume range (Step 370).

The method continues by associating data values from the geophysical data sets with the sub-volumes, forming a background data volume, evaluating the data value versus the background data volume, and populating an output data set (Steps 130, 140, 145, 150, and 160). The process then repeats itself until all points of interest in a three-dimensional seismic survey volume are analyzed (Step 180). The method ends by evaluating the output data set to find discrete sampling locations with specific geophysical responses (Step 170).

Since the described method chooses a random seed trace each time, the method can include the step of tabulating the number of times each trace or each discrete sampling location appears in the focus sub-volumes. Based upon the tabulation, the method can end under different scenarios specified by the user. For example, the method can end when each trace or each discrete sampling location has appeared at least one in a focus sub-volume. Alternatively, the method can end when the average number of times a given trace or discrete sampling location appears in a focus sub-volume reaches a predetermined value.

Alternatively, the method can end after a set number of iterations. In this embodiment, the tabulation is not required and the user can set the number of iterations so that a high statistical probability exists that each trace or discrete sampling location has appeared in a set number of focus sub-volumes.

In each of the described embodiments of the method, a data value that is deemed to be outside a background data volume can be removed from future sub-volumes. By removing this data from background sub-volumes, the anomalous areas, as identified in previous focus areas, do not expand the background data volume shapes to include regions that should be considered anomalous and hence outside of correctly constructed background data volume shapes.

The seismic data volumes used in the analysis can be generated from any defined attribute generating algorithm. Examples of data that can be analyzed in seismic volume format include seismic velocity data processed using a defined attribute generating algorithm, a set of geophysical gravity data extract, compiled or collected for a 3D volume, or a set of petro-physical measurements, such as resistively, for a 3D volume of interest, and a set of compiled or collected engineering data, such as initial production rate (IP) for a horizon of interest.

The 3D seismic volume file can be a set of compiled seismic reflection data, processed using a defined attribute generating algorithm and extracted for, in relation to or in conjunction with a sub-volume of interest or a set of compiled seismic velocity data processed using a defined attribute generating algorithm and extracted for or in conjunction with a sub-volume of interest. This data can be processed to extract internal structures within the data, as in amplitude variation with recording offset or NMO velocity. Such specialized extractions stored in a 3D volume format can be suitable as input to these embodied methods.

While this method has been described with emphasis on the preferred embodiments, it should be understood that within the scope of the appended claims, the method might be practiced other than as specifically described herein

What is claimed is:

1. A method for scanning geophysical data sets, wherein the method comprises the steps of:
    a. selecting a focus sub-volume, wherein the focus sub-volume comprises a plurality of discrete sampling locations, wherein the plurality of discrete sampling locations is located within at least two geophysical data sets;
    b. selecting a background sub-volume, wherein the background sub-volume is proximal to the focus sub-volume, wherein the background sub-volume comprises a plurality of background discrete sampling locations, wherein the plurality of background discrete sampling locations is located within at least two geophysical data sets;
    c. associating data values from the geophysical data sets with each discrete sampling location and each background discrete sampling location;
    d. forming a background data volume, wherein the background data volume comprises the data values associated with the background discrete sampling locations;
    e. normalizing the background data volume and each data value, forming a normalized background data volume and normalized data values;
    f. comparing whether each normalized data value associated with each discrete sampling location is inside or outside of the normalized background data volume to calculate a distance value, wherein if the normalized data value is inside the normalized background data volume, the distance value is zero, and wherein if the normalized data value is outside the normalized background data volume, the distance value is a non-zero value;
    g. populating an output data set with the distance values associated with each discrete sampling location; and
    h. identifying discrete sampling locations within the output data set to identify specific geophysical responses.

2. The method of claim 1, wherein the step of normalizing comprises the steps of
    a. removing from the background data volume any data values associated with discrete sampling locations that have previously been assigned the non-zero value;
    b. determining a mean and a sequence of normalization factors for each data type in the background data volume;
    c. subtracting from each data point in the background data volume the mean and dividing by the sequence of normalization factors; and
    d. subtracting from each discrete sampling location the mean from the background data volume and dividing by the corresponding sequence of normalization factors.

3. The method of claim 1, further comprising the step of assigning a sign to each non-zero value based on a direction of the normalized discrete sampling point from the origin of the normalized background data volume.

4. The method of claim 1, further comprising the step of setting specific normalized data values to zero before comparing to the normalized background data volume.

5. The method of claim 1, wherein the geophysical data sets are selected from the group consisting of:
    a. a 3D set of compiled seismic reflection data processed using a defined attribute generating algorithm;

b. a 3D set of compiled seismic velocity data processed using a defined attribute generating algorithm;
c. a 3D set of geophysical gravity data compiled for a volume of interest;
d. a 3D set of compiled geologic measurements for a volume of interest;
e. a 3D set of petro-physical measurements for a volume of interest; and
f. combinations thereof.

6. The method of claim 1, wherein the step of selecting the focus sub-volume is performed by selecting a set of closed polygons.

7. The method of claim 1, wherein the focus sub-volume is selected from the group consisting of a geographic area for a hydrocarbon reservoir, a geographic area for a water reservoir, a contiguous hydrocarbon and water reservoir, and combinations thereof.

8. The method of claim 1, wherein the step of forming a background data volume is performed by plotting the data values associated with the background discrete sampling locations using geographic coordinates, wherein the geographic coordinates comprise:
   a. X-Y prospect coordinate system;
   b. X-Y field development system;
   c. latitude and longitude;
   d. internal 3D seismic survey coordinates; and
   e. combinations thereof.

9. A method of systematically scanning geophysical data sets, wherein the method comprises the steps of:
   a. setting a focus sub-volume range and a background sub-volume range;
   b. forming a first focus sub-volume, wherein the first focus sub-volume comprises a first focus volume randomly selected from the focus sub-volume range, wherein the focus sub-volume comprises a plurality of first discrete sampling locations, wherein the plurality of first discrete sampling locations is located within at least two geophysical data sets;
   c. forming a first background sub-volume, wherein the first background sub-volume is proximal to the first focus sub-volume, wherein the first background sub-volume comprises a first background volume randomly selected from the background sub-volume range, wherein the first background sub-volume comprises a plurality of first background discrete sampling locations, wherein the plurality of first background discrete sampling locations is located within at least two geophysical data sets;
   d. associating data values from the geophysical data sets with each first discrete sampling location and each first background discrete sampling location;
   e. forming a first background data volume, wherein the first background data volume comprises the data values associated with the first background discrete sampling locations;
   f. normalizing the first background data volume and each data value, forming a first normalized background data volume and normalized data values;
   g. determining whether each normalized data value associated with each first discrete sampling location is inside or outside of the first normalized background data volume to calculate a distance value, wherein if the normalized data value is inside the normalized first background data volume, the distance value is zero, and wherein if the normalized data value is outside the first normalized background data volume, the distance value is non-zero;
   h. populating an output data set with the distance values associated with each first discrete sampling location;
   i. forming a second focus sub-volume, wherein the second focus sub-volume is proximal to the first focus sub-volume, wherein the second focus sub-volume comprises a second focus volume randomly selected from the focus sub-volume range, wherein the second focus sub-volume comprises a plurality of second discrete sampling locations, wherein the plurality of second discrete sampling locations is located within at least two geophysical data sets,
   j. forming a second background sub-volume, wherein the second background sub-volume is proximal to the second focus sub-volume, wherein the second background sub-volume comprises a second background volume randomly selected from the background sub-volume range, wherein the second background sub-volume comprises a plurality of second background discrete sampling locations, wherein the plurality of second background discrete sampling locations is located within at least two geophysical data sets;
   k. forming a second background data volume, wherein the second background data volume comprises the data values associated with the second background discrete sampling locations;
   l. normalizing the second background data volume, forming a second normalized background data volume;
   m. determining whether each normalized data value associated with each second discrete sampling location is inside or outside of the normalized second background data volume to calculate the distance value, wherein if the normalized data value is inside the normalized second background data volume, the distance value is zero, and wherein if the normalized data value is outside the second normalized background data volume, the distance value is non-zero;
   n. populating the output data set with the distance values associated with each second discrete sampling location; and
   o. identifying discrete sampling locations within the output data set to identify specific geophysical responses.

10. The method of claim 9, further comprising the step of repeating steps (h) through (l) to form the output data set for the geophysical data sets.

11. The method of claim 9, further comprising the step of forming the second focus sub-volume comprises the step of selecting the second focus sub-volume so that the second focus sub-volume is beneath the first focus sub-volume, wherein subsequent focus sub-volumes are beneath previous focus sub-volumes.

12. The method of claim 11, further comprising the steps
   a. forming a third subsequent focus sub-volume aside the first focus sub-volume once the focus sub-volumes beneath the first focus sub-volume are completed;
   b. forming a fourth focus sub-volume so that the fourth focus sub-volume is beneath the third focus sub-volume, wherein subsequent focus sub-volumes are beneath previous focus sub-volumes.

13. The method of claim 9, further comprising the step of removing the data value from the background data volumes when the data value is associated with the discrete sampling location that has been assigned the non-zero distance from the normalized background data volume.

14. The method of claim 9, wherein the focus volumes and background volumes are selected values.

15. A method of scanning geophysical data sets to find the presence of hydrocarbons, wherein the method comprises the steps of:
 a. setting a focus sub-volume range and a background sub-volume range;
 b. randomly selecting a first seed trace at random, wherein the first seed trace is located within at least two geophysical data sets;
 c. forming a first focus sub-volume, wherein the first focus sub-volume comprises the first seed trace, wherein the first focus sub-volume comprises a first focus volume randomly selected from the focus sub-volume range, wherein the first focus sub-volume comprises a plurality of first discrete sampling locations, wherein the plurality of first discrete sampling locations is located within at least two geophysical data sets;
 d. forming a first background sub-volume, wherein the first background sub-volume is proximal to the first focus sub-volume, wherein the first background sub-volume comprises a first background volume randomly selected from the background sub-volume range, wherein the first background sub-volume comprises a plurality of first background discrete sampling locations, wherein the plurality of first background discrete sampling locations is located within at least two geophysical data sets;
 e. associating data values from the geophysical data sets with each first discrete sampling location and each first background discrete sampling location;
 f. forming a first background data volume, wherein the first background data volume comprises the data values associated with the first background discrete sampling locations;
 g. normalizing the first background data volume and each data value, forming a first normalized background data volume and normalized data values;
 h. determining whether each normalized data value associated with each first discrete sampling location is inside or outside of the first normalized background data volume to calculate a distance value, wherein if the normalized data value is inside the normalized first background data volume, the distance value is zero, and wherein if the normalized data value is outside the first normalized background data volume, the distance value is non-zero;
 i. populating an output data set with the distance values associated with each first discrete sampling location;
 j. randomly selecting a second seed trace, wherein the second seed trace is located within the geophysical data sets;
 k. forming a second focus sub-volume, wherein the second focus sub-volume comprises the second seed trace, wherein the second focus sub-volume comprises a second focus volume randomly selected from the focus sub-volume range, wherein the second focus sub-volume comprises a plurality of second discrete sampling locations, wherein the plurality of second discrete sampling locations is located within at least two geophysical data sets;
 l. forming a second background sub-volume, wherein the second background sub-volume is proximal to the second focus sub-volume, wherein the second background sub-volume comprises a second background volume randomly selected from the background sub-volume range, wherein the second background sub-volume comprises a plurality of second background discrete sampling locations, wherein the plurality of second background discrete sampling locations is located within at least two geophysical data sets;
 m. associating data values from the geophysical data sets with each second discrete sampling location and each second background discrete sampling location;
 n. forming a second background data volume, wherein the second background data volume comprises the data values associated with the second background discrete sampling locations;
 o. normalizing the second background data volume, forming a second normalized background data volume,
 p. determining whether each normalized data value associated with each second discrete sampling location is inside or outside of the second normalized background data volume to calculate the distance value, wherein if the normalized data value is inside the second normalized background data volume, the distance value is zero, and wherein if the normalized data value is outside the second normalized background data volume, the distance value is non-zero;
 q. populating the output data set with the distance values associated with each second discrete sampling location; and
 r. identifying discrete sampling locations within the output data set to identify specific geophysical responses.

16. The method of claim 15, further comprising the step of repeating steps (i) through (o) to form the output data set for the geophysical data sets.

17. The method of claim 15, further comprising the step of tabulating the number of times each discrete sampling location appears in the focus sub-volumes.

18. The method of claim 17, further comprising the step of stopping the method when the number of times each discrete sampling location appears in the focus sub-volumes reaches a specific value.

19. The method of claim 18, wherein the specific value is a mean of the number of times each discrete sampling location or a pre-selected value.

20. The method of claim 15, further comprising the step of removing the data value from the background data volumes when the data value is outside the background data volumes.

21. The method of claim 15, wherein the seed trace and background volumes are selected values.

22. The method of claim 15, wherein the focus volumes and background volumes are selected values.

* * * * *